(12) United States Patent
Shimizu et al.

(10) Patent No.: US 8,375,057 B2
(45) Date of Patent: Feb. 12, 2013

(54) DATABASE SYSTEM, SERVER DEVICE, TERMINAL DEVICE, AND DATA PRESENTATION METHOD

(75) Inventors: Kenji Shimizu, Shizuoka-ken (JP); Masanori Sambe, Shizuoka-ken (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 112 days.

(21) Appl. No.: 12/959,832

(22) Filed: Dec. 3, 2010

(65) Prior Publication Data

US 2011/0137938 A1      Jun. 9, 2011

(30) Foreign Application Priority Data

Dec. 9, 2009   (JP) ................................. 2009-279698

(51) Int. Cl.
*G06F 7/00*      (2006.01)
*G06F 17/30*     (2006.01)
(52) U.S. Cl. ...................................... 707/784
(58) Field of Classification Search ................... 707/784
See application file for complete search history.

(56) References Cited

U.S. PATENT DOCUMENTS

2008/0201339 A1 *  8/2008  McGrew et al. .............. 707/100

FOREIGN PATENT DOCUMENTS

| JP | 2002-230167 | 8/2002 |
|---|---|---|
| JP | 2002-342137 | 11/2002 |
| JP | 2004-246755 | 9/2004 |
| JP | 2007-531941 | 11/2007 |

OTHER PUBLICATIONS

Japanese Office Action for Application No. 2009-279698 mailed on Sep. 6, 2011.
Japanese Office Action for Application No. 2009-279698 mailed on Feb. 14, 2012.

* cited by examiner

*Primary Examiner* — James Trujillo
*Assistant Examiner* — Jeffrey Chang
(74) *Attorney, Agent, or Firm* — Turocy & Watson, LLP (57) ABSTRACT

According to one embodiment, a database system includes a first and second storage unit, a reading unit, and a generating unit. The first storage unit stores a first data table in which first data records, each including information about information fields, are described. The second storage unit stores a second data table in which second data records including pieces of attribute information, each representing a display attribute about the information field included in the first data record, are described. The reading unit reads out the first and second data records from the first and second storage units in accordance with the fact that displaying the information included in the first data table is requested. The generating unit generates an image for displaying the information included in the read first data record in accordance with the display attribute represented by the attribute information included in the read second data.

7 Claims, 10 Drawing Sheets

| Company code | ITM_COD | ITM_NAM | ITM_VAL | ITM_UPD | FFU1 | FFU2 | FFU3 | FFU4 | FFU5 |
|---|---|---|---|---|---|---|---|---|---|
| 001 | 49401957 | ○○○springs | 110 | 2009/02/01 | 70 | 15 | | | |
| 001 | 49403332 | △△△tea | 110 | 2008/12/20 | 60 | 10 | | | |
| 002 | 49401957 | ○○○springs | 110 | 2008/12/20 | 0494000 | 70 | | | |
| 002 | 49402287 | □□□water | 110 | 2008/12/20 | 0494001 | 50 | | | |

F I G. 4

| Company code | Display Index | Logical field name | Physical field name | Type | Display name | Display application | Update application | Input application | Comments |
|---|---|---|---|---|---|---|---|---|---|
| 999 | 1 | ITM_COD | ITM_COD | char | JAN Code | 1 | 1 | 1 | |
| 999 | 2 | ITM_NAM | ITM_NAM | char | Item name | 1 | 1 | 1 | |
| 999 | 3 | ITM_VAL | ITM_VAL | int | Selling price | 1 | 1 | 1 | |
| 999 | 4 | ITM_UPD | ITM_UPD | date | Update date | 1 | 1 | 1 | |
| 999 | 5 | FFU1 | FFU1 | string | FFU1 | 0 | 0 | 0 | |
| 999 | 6 | FFU2 | FFU2 | string | FFU2 | 0 | 0 | 0 | |
| 001 | 5 | ITM_CST | FFU1 | int | Buying price | 1 | 1 | 1 | |
| 001 | 6 | ITM_GRS | FFU2 | int | Gross profit rate | 1 | 0 | 0 | |
| 002 | 5 | VND_COD | FFU1 | char | Supplier code | 1 | 1 | 1 | |
| 002 | 6 | ITM_CST | FFU2 | int | Buying price | 1 | 1 | 1 | |

F I G. 5

F I G. 6

| Company code | ITM_COD | ITM_NAM | ITM_VAL | ITM_UPD | FFU1 | FFU2 | FFU3 | FFU4 | FFU5 |
|---|---|---|---|---|---|---|---|---|---|
| 001 | 49401957 | ○○○springs | 110 | 2009/02/01 | 70 | 15 | | | |
| 001 | 49403332 | △△△tea | 110 | 2008/12/20 | 60 | 10 | | | |

F I G. 7

| Company code | Display index | Logical field name | Physical field name | Type | Display name | Display application | Update application | Input application | Comments |
|---|---|---|---|---|---|---|---|---|---|
| 999 | 1 | ITM_COD | ITM_COD | char | JAN code | 1 | 1 | 1 | |
| 999 | 2 | ITM_NAM | ITM_NAM | char | Item name | 1 | 1 | 1 | |
| 999 | 3 | ITM_VAL | ITM_VAL | int | Selling price | 1 | 1 | 1 | |
| 999 | 4 | ITM_UPD | ITM_UPD | date | Update date | 1 | 1 | 1 | |
| 999 | 5 | FFU1 | FFU1 | string | FFU1 | 0 | 0 | 0 | |
| 999 | 6 | FFU2 | FFU2 | string | FFU2 | 0 | 0 | 0 | |
| 001 | 5 | ITM_CST | FFU1 | int | Buying price | 1 | 1 | 1 | |
| 001 | 6 | ITM_GRS | FFU2 | int | Gross profit rate | 1 | 0 | 0 | |

F I G. 8

| JAN Code | Item name | Selling price | Update date | Buying price | Gross profit rate |
|---|---|---|---|---|---|
| 49401957 | ○○○springs | 110 | 2009/02/01 | 70 | 15 |
| 49403332 | △△△tea | 110 | 2008/12/20 | 60 | 10 |
|  |  |  |  |  |  |
|  |  |  |  |  |  |
|  |  |  |  |  |  |

FIG. 9

| JAN Code | Item name | Selling price | Update date | Supplier code | Buying price |
|---|---|---|---|---|---|
| 49401957 | ○○○springs | 110 | 2008/12/20 | 0494000 | 70 |
| 49403332 | △△△tea | 110 | 2008/12/20 | 0494001 | 60 |
|  |  |  |  |  |  |
|  |  |  |  |  |  |
|  |  |  |  |  |  |

DATABASE SYSTEM, SERVER DEVICE, TERMINAL DEVICE, AND DATA PRESENTATION METHOD

CROSS-REFERENCE TO RELATED APPLICATIONS

This application is based upon and claims the benefit of priority from Japanese Patent Application No. 2009-279698, filed on Dec. 9, 2009, the entire contents of which are incorporated herein by reference.

FIELD

Embodiments described herein relate generally to a database system, a server device, a terminal device, and a data presentation method.

BACKGROUND

Many database systems such as database systems included in a POS (point-of-sale) system are generally designed to meet user's needs (for example, a company's needs). A technique that enables such a made-to-order database system to be easily designed is known, for example, as disclosed in JP-A-2004-246755.

However, in such a made-to-order database system, as an application to generate an image for displaying information described in a database, a dedicated application corresponding to the structure of the database needs to be developed separately. Moreover, when the structure of the database is updated, the application needs to be changed accordingly.

In view of such circumstances, it is demanded that an image for displaying information included in each of databases having different structures should be generated by common processing.

DETAILED DESCRIPTION

In general, according to one embodiment, a database system includes a first storage unit, a second storage unit, a reading unit, and a generating unit. The first storage unit stores a first data table in which plural first data records, each including information about plural information fields, are described. The second storage unit stores a second data table in which second data records including plural pieces of attribute information, each representing a display attribute about the information field included in the first data record, are described. The reading unit reads out the first and second data records from the first and second storage units in accordance with the fact that displaying the information included in the first data table is requested. The generating unit generates an image for displaying the information included in the first data record read out by the reading unit in accordance with the display attribute represented by the attribute information included in the second data record read by the reading unit.

Hereinafter, an embodiment will be described with reference to the drawings.

Figure 1:
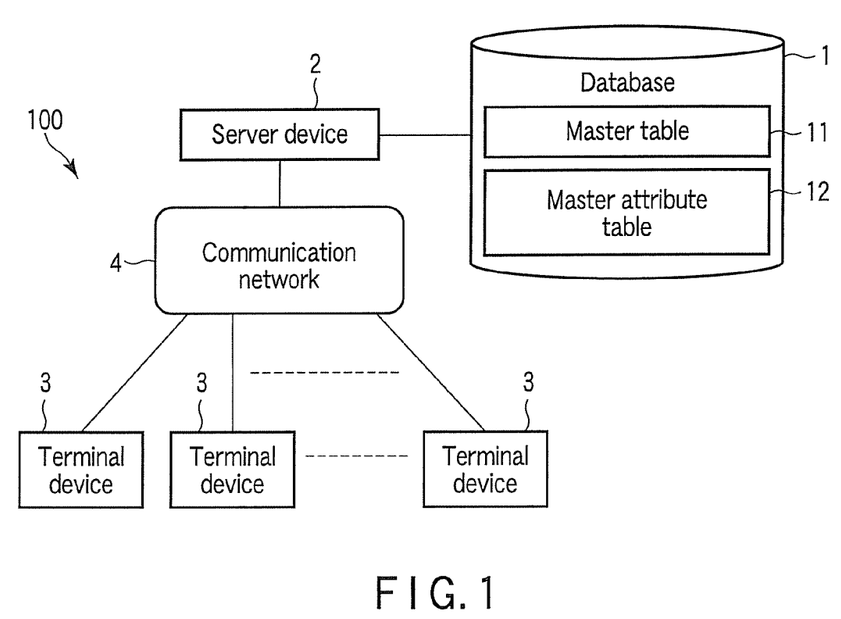
FIG. 1 is a block diagram showing a database system according to an embodiment.

FIG. 1 is a block diagram showing a database system 100.

The database system 100 includes a database 1, a server device 2, and plural terminal devices 3.

The database 1 is connected to the server device 2. Each of the plural terminal devices 3 communicates with the server device 2 via a communication network 4. The communication network 4 is typically the internet but may be various other networks such as local area network or PSTN (public switched telephone network).

The database system 100 is used, for example, to cause plural companies to share the database 1 in order to manage information about articles in each of the plural companies. In this case, for example, an operator who provides the above service owns the database 1 and the server device 2. The companies as users of the service own the terminal devices 3. In the following description, it is assumed that the database system 100 provides the service as described above.

However, information managed in the database system 100 and users who access the information may be arbitrary. The service provided by the database system 100 is not limited to the above-described service. For example, an operator who provides the service may own the database 1 and the server device 2, and plural employees of one company may use the terminal devices 3. Alternatively, a company may own the database 1 and the server device 2, and plural employees of the company may use the terminal devices 3. In these cases, users of the service provided by the database system 100 are departments and employees of each company. Alternatively, for example, an operator who provides the service may own the database 1 and the server device 2, and unspecified plural people who register for use to the operator may use the terminal device 3. In this case, users of the service provided by the database system 100 are people who register for use.

In the database 1, a storage medium such as a hard disk stores a master table 11 and a master attribute table 12. When a hard disk is used as a storage medium, the database 1 includes an access device to read and write data from and to the hard disk. The database 1 also includes an interface unit to send and receive data to and from the server device 2.

Figure 2:
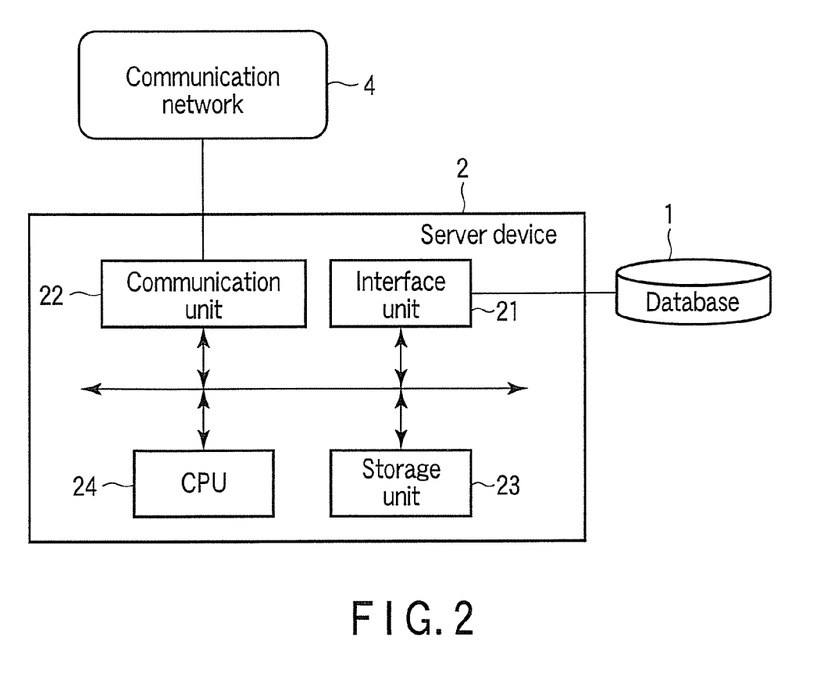
FIG. 2 is a block diagram of a server device shown in FIG. 1.

FIG. 2 is a block diagram showing the server device 2.

The server device 2 has, for example, a server computer device as its basic hardware. The server device 2 includes an interface unit (IF unit) 21, a communication unit 22, a storage unit 23, and a CPU 24.

The interface unit 21 sends and receives data to and from the database 1.

The communication unit 22 carries out known communication processing to communicate with the terminal devices 3 via the communication network 4.

The storage unit 23 stores various programs describing procedures of processing that should be carried out by the CPU 24, and various kinds of information such as data read out from the database 1. As the storage unit 23, a storage device such as a memory or hard disk unit built in the computer device, a storage device such as a memory or hard disk unit externally attached to the computer device, or a removable recording medium such as a magnetic disk, magneto-optical disk or optical disk can be used as required. The programs stored in the storage unit 23 include a management application to cause the CPU 24 to carry out management of the database 1 as described below.

The CPU 24 carries out various kinds of processing according to the programs stored in the storage unit 23. The CPU 24 then functions as the following several units by the processing according to the management application. One of the units identifies and then authenticates a company which requests for access to the information stored in the database 1 from the terminal 3. Another one of the units reads out the data record that is described in the master table 11 in association with the recognized company, from the database 1. Still another one of the units reads out the data record that is described in the master attribute table 12 in association with the recognized company, from the database 1. Still another one of the units controls the communication unit 22 to transmit the read-out data records to the terminal device 3 at which the access request is made. A part or all of the functions provided in the CPU 24 can also be realized by hardware such as a logic circuit. Each of the functions provided in the CPU 24 can also be realized by a combination of hardware and software control.

Figure 3:
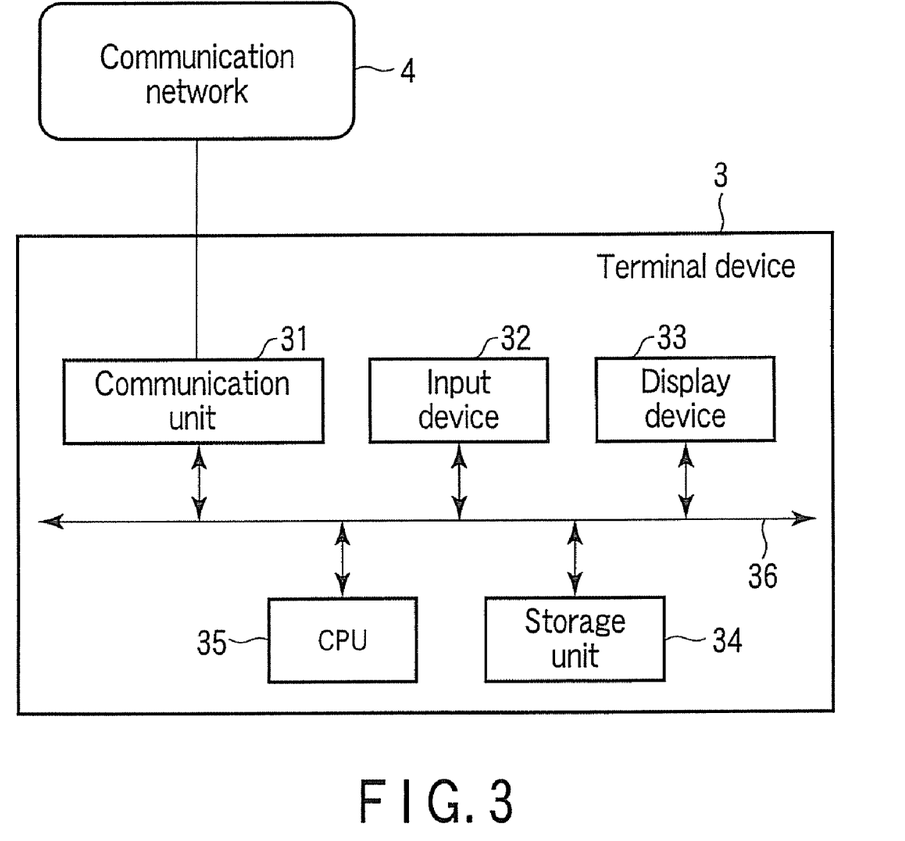
FIG. 3 is a block diagram of a terminal device shown in FIG. 1.

FIG. 3 is a block diagram showing the terminal device 3.

Each of the terminal devices 3 has, for example, a computer device such as a general-purpose computer, as its basic hardware. The terminal device 3 includes a communication unit 31, an input device 32, a display device 33, a storage unit 34, and a CPU 35.

The communication unit 31 carries out known communication processing to communicate with the server device 2 via the communication network 4.

The input device 32 inputs various instructions from the user. The input device 32 can include various known input devices, for example, a keyboard and mouse.

The display device 33 displays an image or the like to allow the user to browse various kinds of information. As the display device 33, various known display devices such as a liquid crystal display device can be used. Instead of providing the display device 33 in the terminal device 3, an externally attached general-purpose display device may also be used.

The storage unit 34 stores various programs describing procedures of processing that should be carried out by the CPU 35, and data that are handled in the processing by the CPU 35 based on the programs. As the storage unit 34, a storage device such as a memory or hard disk unit built in the computer device, a storage device such as a memory or hard disk unit externally attached to the computer device, or a removable recording medium such as a magnetic disk, magneto-optical disk or optical disk can be used as required. The programs stored in the storage unit 34 include an access application to cause the CPU 35 to carry out access to the database 1 as described below. The programs stored in the storage unit 34 also include a generation middleware to cause the CPU 35 to carry out processing to generate an image for allowing the user to browse the information stored in the database 1, on the basis of the data delivered from the access application.

The CPU 35 carries out various kinds of processing according to the programs stored in the storage unit 34. The CPU 35 then functions as the following several units by the processing according to the access application. One of the units controls the communication unit 31 to acquire information which enables the server device 2 to identify and authenticate a company, and then controls the communication unit 31 to transmit that information to the server device 2. Another one of the units controls the communication unit 31 to receive the data record transmitted from the server device 2. Still another one of the units controls generation of an image according to the generation middleware. Still another one of the units controls the display device 33 to display the generated image. A part or all of the functions provided in the CPU 35 can also be realized by hardware such as a logic circuit. Each of the functions provided in the CPU 35 can also be realized by a combination of hardware and software control.

Figure 4:
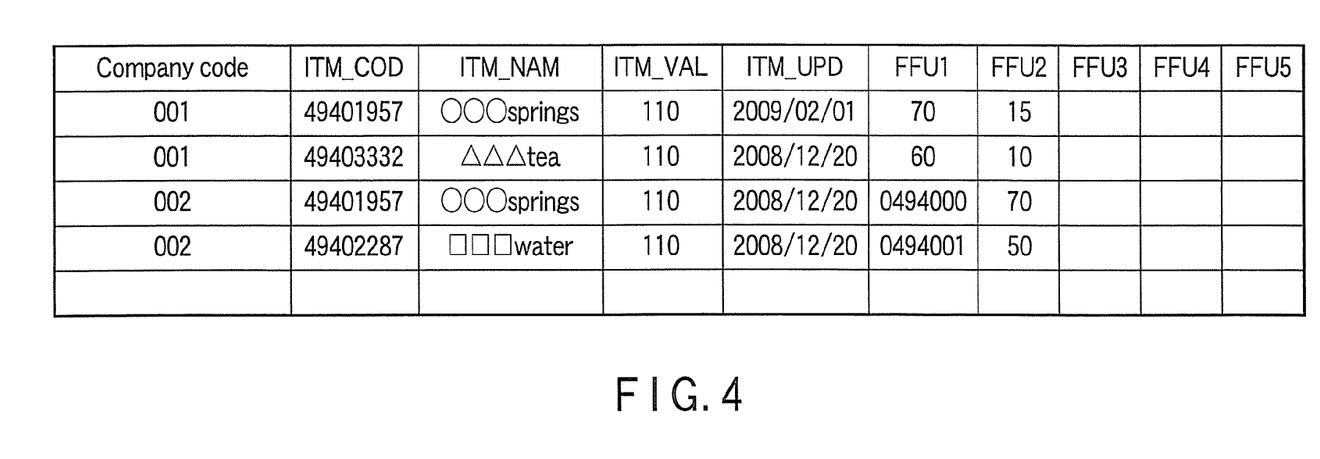
FIG. 4 shows an example of the structure of a master table shown in FIG. 1.

FIG. 4 shows an example of the structure of the master table 11.

The master table 11 is a data table describing plural data records. Each of the data records included in the master table 11 includes information about plural information fields corresponding to plural subjects. In the example shown in FIG. 4, information fields included in one data record relate to the subjects of company code, item code (ITM_COD), item name (ITM_NAM), selling price (ITM_VAL), update date (ITM_UPD), and first to fifth extension subjects (FFU1 to FFU5). Of these information fields, the information fields relating to company code, item code, item name, selling price and update date describe information about subject that are common to plural companies. The information fields relating to the first to fifth extension subjects describe information about separate subjects for each of the plural companies. The data records included in the master table 11 correspond to the companies identified with the information described in the information field of "company code" included in the data records.

Figure 5:
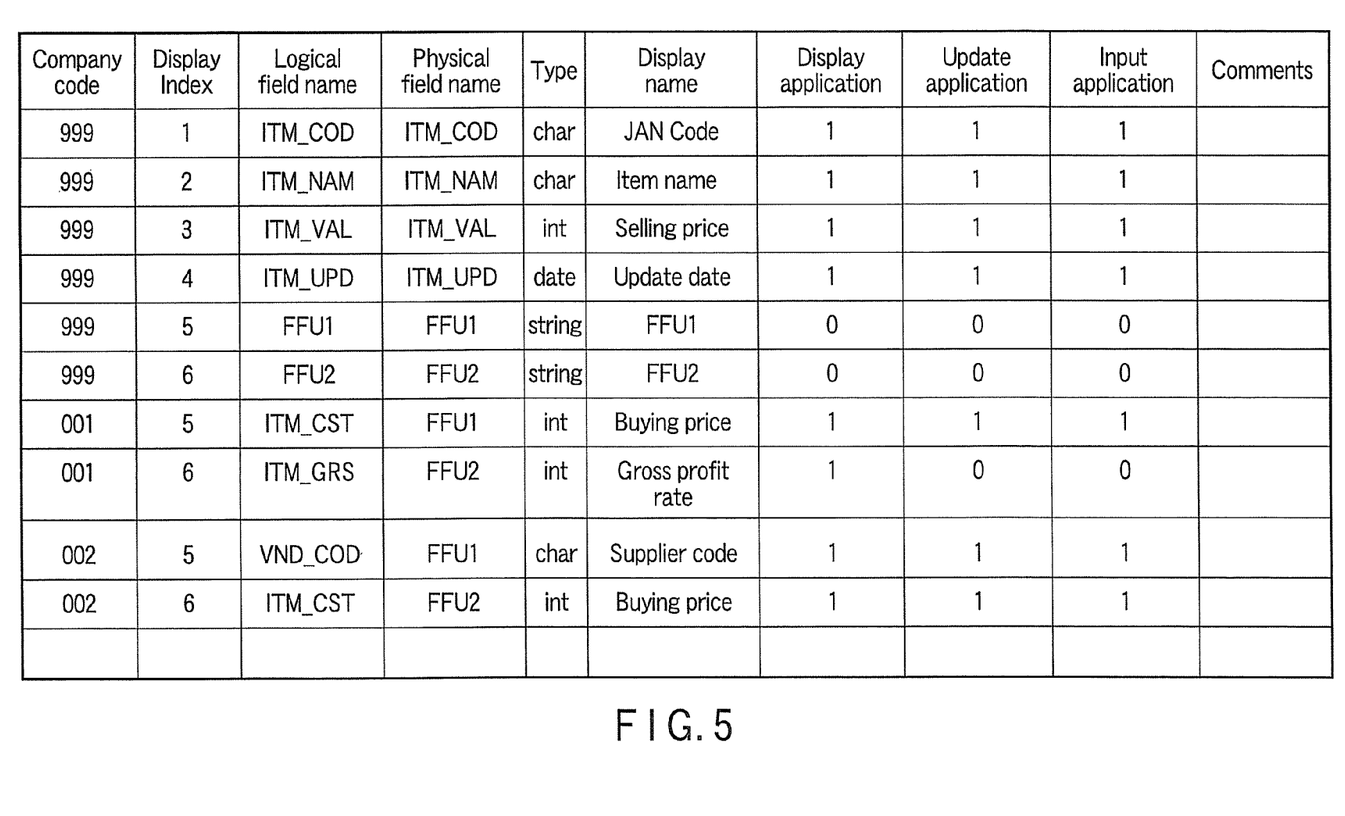
FIG. 5 shows an example of the structure of a master attribute table shown in FIG. 1.

FIG. 5 shows an example of the structure of the master attribute table 12.

The master attribute table 12 is a data table describing plural data records. Each of the data records included in the master attribute table 12 includes information about plural information fields corresponding to plural subjects. In the example shown in FIG. 5, information fields included in one data record relate to company code, display index, logical field name, physical field name, type, display name, display application, update application, input application, and comments. A part of these information fields represents display attributes of the information included in the master table 11. Specifically, in FIG. 5, the information described in the information fields of display index, logical field name, physical field name, type, display name and display application represent display attributes. The data records included in the master attribute table 12 correspond to companies that are identified with the information described in the information field of "company code" included in the data records.

The operation of the database system 100 configured as described above will now be described.

Figure 6:
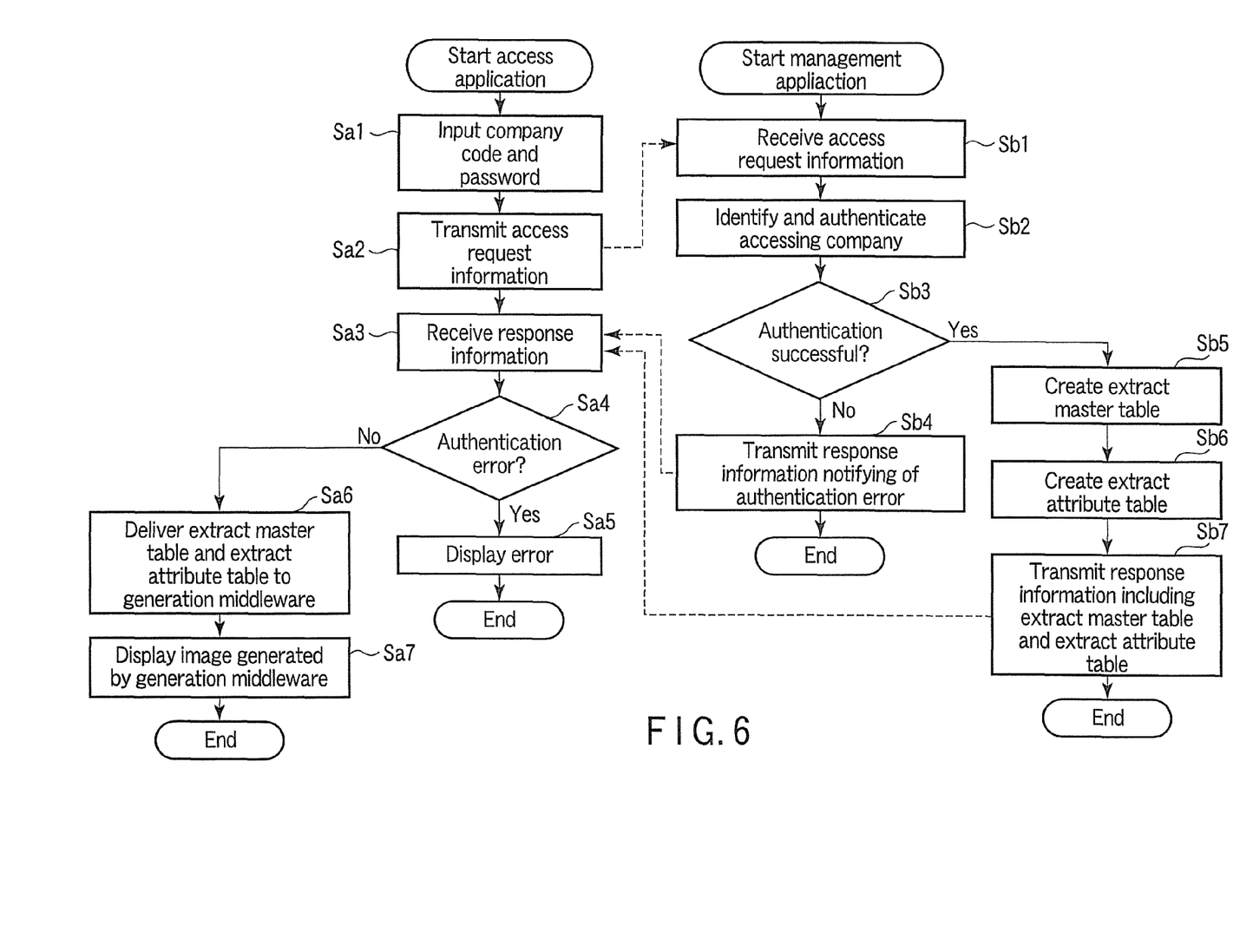
FIG. 6 is a flowchart for a CPU shown in FIG. 2 and a CPU shown in FIG. 3.

FIG. 6 is a flowchart for the CPUs 24 and 35. The left side of FIG. 6 shows the processing procedure in the CPU 35 according to the access application. The right side of FIG. 6 shows the processing procedure in the CPU 24 according to the management application.

In ACT Sa1, the CPU 35 causes the operator of the terminal device 3 to designate the company code and password allocated to the company to which the operator belongs, and inputs the designated company code and password. This input uses the input device 32, for example.

In ACT Sa2, the CPU 35 creates authentication request information including the company code and password inputted in ACT Sa1, and transmits this information from the communication unit 31 to the server device 2 via the communication network 4.

As the authentication request information transmitted from the terminal device 3 as described above reaches the server device 2, the CPU 24 in ACT Sb1 receives the authentication request information via the communication unit 22.

In ACT Sb2, the CPU 24 recognizes the company that is accessing (hereinafter referred to as accessing company) on the basis of the company code included in the received authentication request information and confirms whether the password included in the authentication request information is set for the accessing company or not, thus authenticating the accessing company.

In ACT Sb3, the CPU 24 confirms whether the authentication is successful or not. When the authentication is unsuccessful, the CPU 24 proceeds to ACT Sb4.

In ACT Sb4, the CPU 24 transmits response information to notify the terminal device 3 of an authentication error, to the terminal device 3 as the transmission source of the authentication request information received in ACT Sb1, from the communication unit 22 via the communication network 4.

Meanwhile, when the authentication is successful, the CPU 24 proceeds from ACT Sb3 to ACT Sb5.

In ACT Sb5, the CPU 24 creates an extract master table. Specifically, the CPU 24 reads out from the master table 11 a data record associated with the accessing company, of the data records described in the master table 11. The data record associated with the accessing company refers to the data record in which the information described in the information field relating to company code is coincident with the company code included in the authentication request information received in ACT Sb1. The CPU 24 then creates an extract master table as an aggregate of all the corresponding data records.

Figure 7:
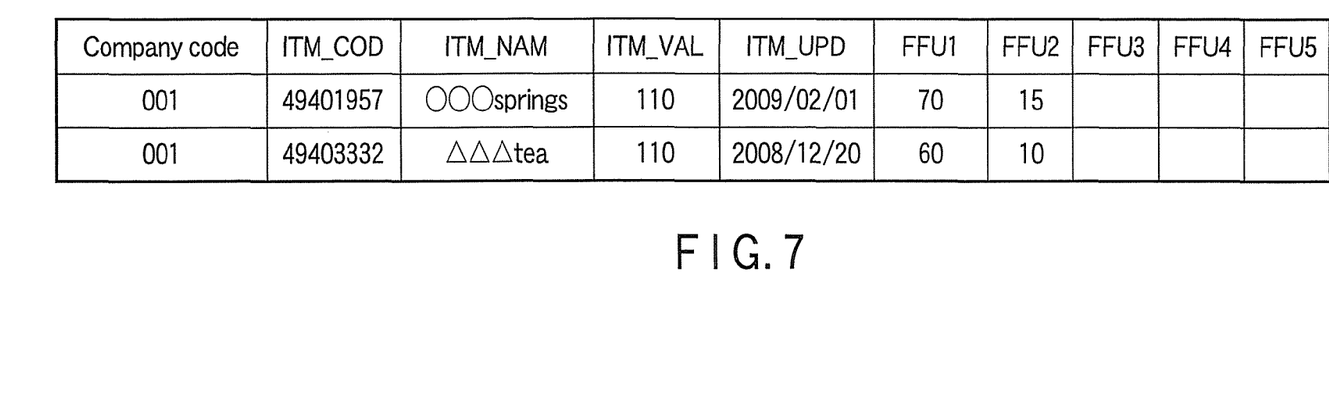
FIG. 7 shows an example of an extract master table.

FIG. 7 shows an example of the extract master table. FIG. 7 shows an extract master table in the case where the master table 11 shown in FIG. 4 is used and the company code of the accessing company is "001".

In ACT Sb6, the CPU 24 creates an extract attribute table. Specifically, the CPU 24 reads out from the master table 11 a data record associated with the accessing company, of the data records described in the master attribute table 12. The data record associated with the accessing company is the data record in which the information described in the information field relating to company code shows a common code, and the data record in which the information described in the information field relating to company code is coincident with the company code included in the authentication request information received in ACT Sb1. The CPU 24 then creates an extract attribute table as an aggregate of all the corresponding data records.

Figure 8:
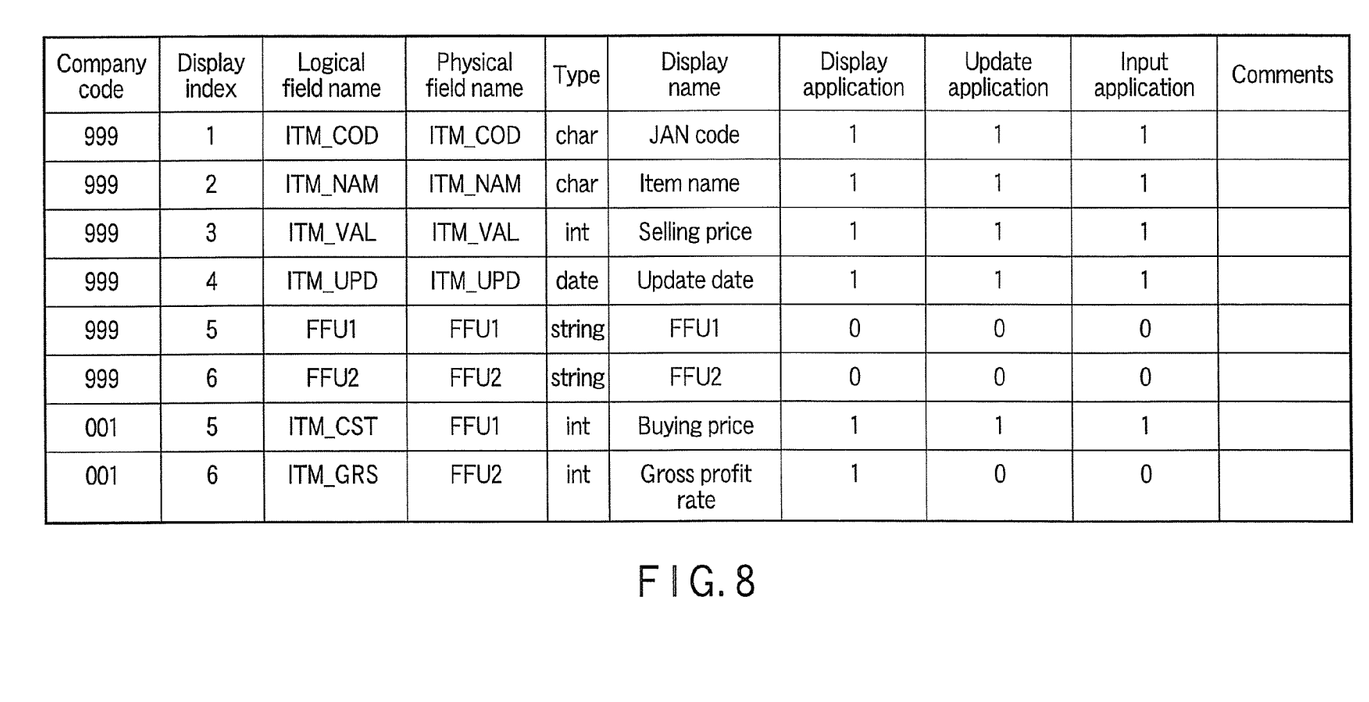
FIG. 8 shows an example of an extract attribute table.

FIG. 8 shows an example of the extract attribute table. FIG. 8 shows an extract attribute table in the case where the master attribute table 12 shown in FIG. 5 is used, the common code is "999", and the company code of the accessing company is "001".

In ACT Sb7, the CPU 24 transmits response information including the extract master table and the extract attribute table that are created as described above, to the terminal device 3 as the transmission source of the authentication request information received in ACT Sb1, from the communication unit 22 via the communication network 4.

Meanwhile, the CPU 35, after transmitting the access request information in ACT Sa2, waits for the arrival of the response information transmitted from the server device 2. When the response information transmitted from the server device 2 by the CPU 24's processing in ACT Sb4 or ACT Sb7 arrives, the CPU 35 in ACT Sa3 causes the communication unit 31 to receive the response information and then acquires the response information from the communication unit 31.

In ACT Sa4, the CPU 35 confirms whether the response information is the notification of an authentication error or not. When an authentication error is notified of, the CPU 35 proceeds from ACT Sa4 to ACT Sa5.

In ACT Sa5, the CPU 35 causes the display device 33 to show an error display to notify the operator of the authentication error.

On the other hand, when the response information is not the notification of an authentication error, the CPU 35 proceeds from ACT Sa4 to ACT Sa6.

In ACT Sa6, the CPU 35 delivers the extract master table and the extract attribute table included in the response information to the processing by the generation middleware. Specifically, the CPU 35 starts up image generation according to the generation middleware separately from the processing according to the access application, and uses the extract master table and the extract attribute table included in the response information as a target of the image generation. By image generation, the CPU 35 generates an image showing the information included in the extract master table, in the display form that is defined by the information described in the extract attribute table.

Specifically, in the extract attribute table shown in FIG. 8, the information in the information fields of display index, logical field name, physical field name, type, display name and display application represent the display form in which the information included in the extract master table is to be shown in a table format.

In the information field of display index, a numeric value is described and this numeric value indicates column number.

In the information field of logical field name, the name allocated arbitrarily to each company with respect to each information field in the master table 11 is described.

In the information field of physical field name, the name allocated univocally to each information field in the master table 11 is described. Therefore, in a data record in which the value in the information field of company code is "999", that is, in a data record associated with all the companies, the physical field name is always the same as the logical field name, as shown in FIG. 8. In a data record in which the value in the information field of company code is not "999", that is, in a data record associated with a specific company only, the physical field name may be the same as the logical field name, or may be different from the logical field name as shown in FIG. 8. It is shown that, of the information fields in the master table 11, the information described in the information field to which the name described in the information field of physical field name is allocated is the information that should be displayed in the section of the column number.

In the information field of type, the type of the information displayed in the section of the column number is described.

In the information field of display name, the display name for the column corresponding to the column number is described.

In the information field of display application, the value 0 or 1 is described. A data record in which the value in the information field of display application is 1 is information that is effective for defining the display form.

That is, for example, in the first data record in FIG. 8, it is defined that the display name in the section of the sixth column is "JAN code" and that the information described in the information field of ITM_COD in the master table 11 is to be displayed in this section.

Figure 9:
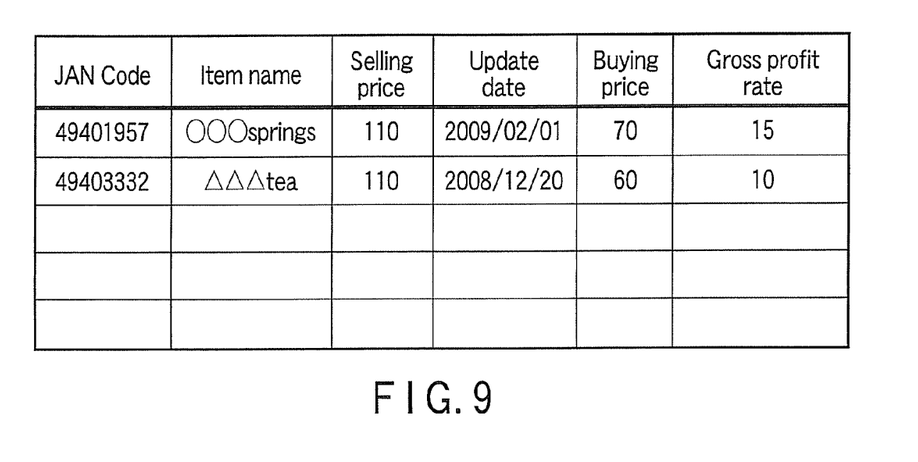
FIG. 9 shows a first example of an image.

Thus, the CPU 35 generates an image as shown in FIG. 9, based on the extract master table shown in FIG. 7 and the extract attribute table shown in FIG. 8.

Figure 10:
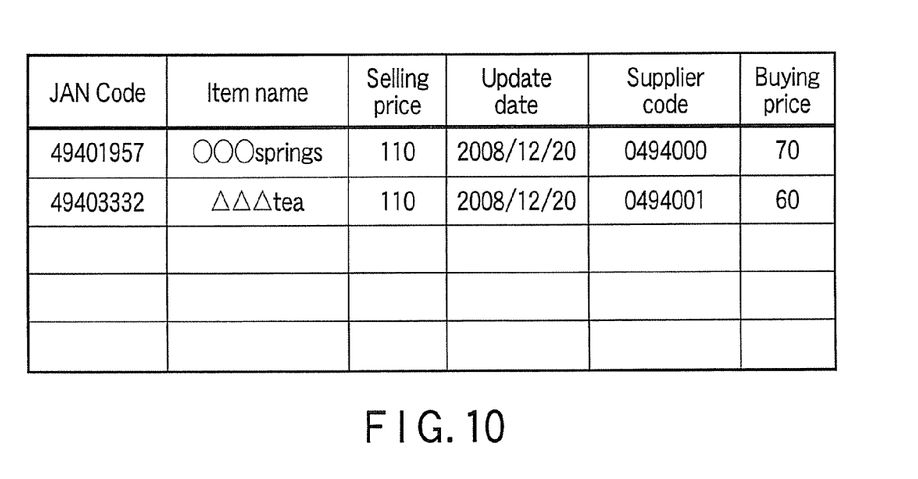
FIG. 10 shows a second example of an image.

When the company code of the accessing company is "002", the CPU 35 generates an image as shown in FIG. 10.

The CPU 35 stores image data representing the image thus generated, to the storage unit 34.

In the processing shown in FIG. 6 according to the access application, the CPU 35 in ACT Sa7 causes the display device 33 to display the image generated as described above.

Thus, when the company having the company code "001" accesses the database 1, for example, the image as shown in FIG. 9 is displayed on the terminal device 3. However, when the company having the company code "002" accesses the database 1, for example, the image as shown in FIG. 10 is displayed on the terminal device 3. In the images shown in FIG. 9 and FIG. 10, different information is shown in the fifth column and the sixth column.

That is, in the database system 100, the master table 11 is shared by plural companies. However, the information field relating to the first to fifth extension subjects (FFU1 to FFU5), of the information fields in the master table 11, can be used by each company to described different kinds of information. In the terminal device 3 already accessing the master table 11, an image that is customized for each company is displayed by common processing. When the structure of the master table 11 is to be changed, the description in the master attribute table 12 may be changed according to that change and no measures have to be taken at the server device 2 or the terminal device 3. Thus, it is possible to use the system according to the needs of each company while sharing the master table 11.

Moreover, in the database system 100, the information fields in which information relating to subjects that are common to plural companies are to be described, and information fields in which separate information for each company can be described are prepared in the master table 11. In the master attribute table 12, the display form shown in the data record having a common code described in the information field of company code is applied commonly to each company. Therefore, in the case of displaying information of a subject that is frequently used by plural companies, in a standard form, the data record for showing the display form need not be described in the master attribute table 12 for each company and the volume of information in the master attribute table 12 can be reduced.

Various modifications of this embodiment can be carried out as follows.

The master table 11 and the mater attribute table 12 may be stored in separate databases.

It is also possible to use only one terminal device 3.

An image may be generated in the server device 2. This image may be transmitted from the server device 2 to the terminal device 3 and may be displayed on the terminal device 3.

A computer device having the functions of the server device 2 except the communication function with the terminal device 3 and the functions of the terminal device 3 except the communication function with the server device 2 may be connected to the database 1 to configure a database system. That is, in the computer device connected to the database 1, the identification of a user, the reading of data records associated with the user from the master table 11 and the master attribute table 12, and the generation of an image based on the read-out data records may be carried out.

Up to this point, the database system 100 is described in which the single database 1 is shared by plural users. However, it is also possible to allow a single user to use a set of master table 11 and master attribute table 12. In this case, the information field of company code, that is, the information field of user identification information, can be omitted from the master table 11 and the master attribute table 12. Then, the server device 2 transmits response information including the entire master table 11 and master attribute table 12 to the terminal device 3 in response to a request from the terminal device 3. In the database system that is modified in this manner, the database 1 needs to be prepared for each user. However, as the program to cause the computer device to function as the terminal device 3, all users can use the same program. That is, this program need not be developed separately for each user. Consequently, the effort required for the development of the program can be reduced and the price of the program can be lowered as well.

Figure 11:
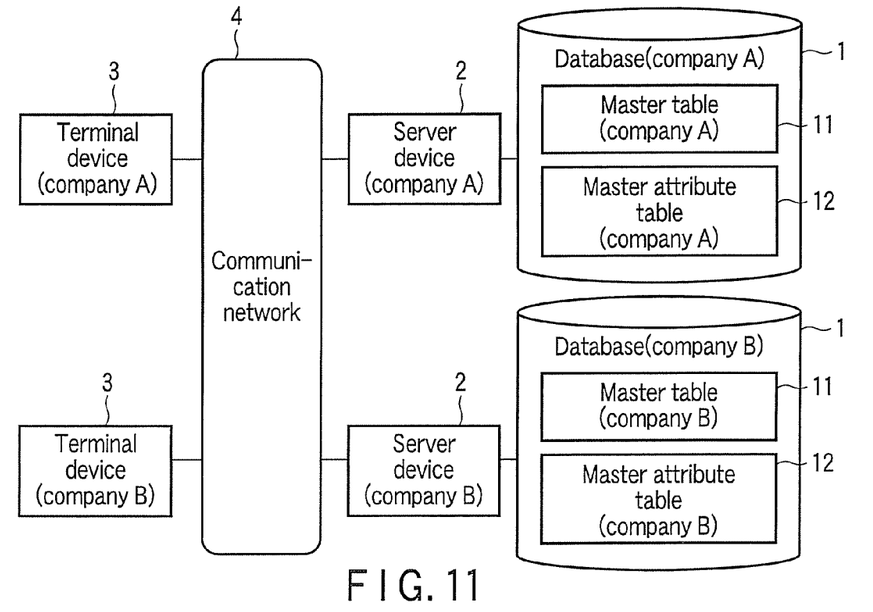
FIG. 11 is a block diagram showing a database system according to a first modification.

FIG. 11 is a block diagram showing a first form of the database system that is modified as described above.

The database system shown in FIG. 11 includes the database 1, the server device 2 and the terminal device 3 for company A, and the database 1, the server device 2 and the terminal device 3 for company B. For example, the server device 2 for company A reads out the master table 11 and the master attribute table 12 for company A from the database 1 for company A in response to a request from the terminal device 3 for company A, and transmits the read-out tables to the terminal device 3 for company A.

In this form of configuration, separate communication networks 4 may be provided for company A and company B.

Figure 12:
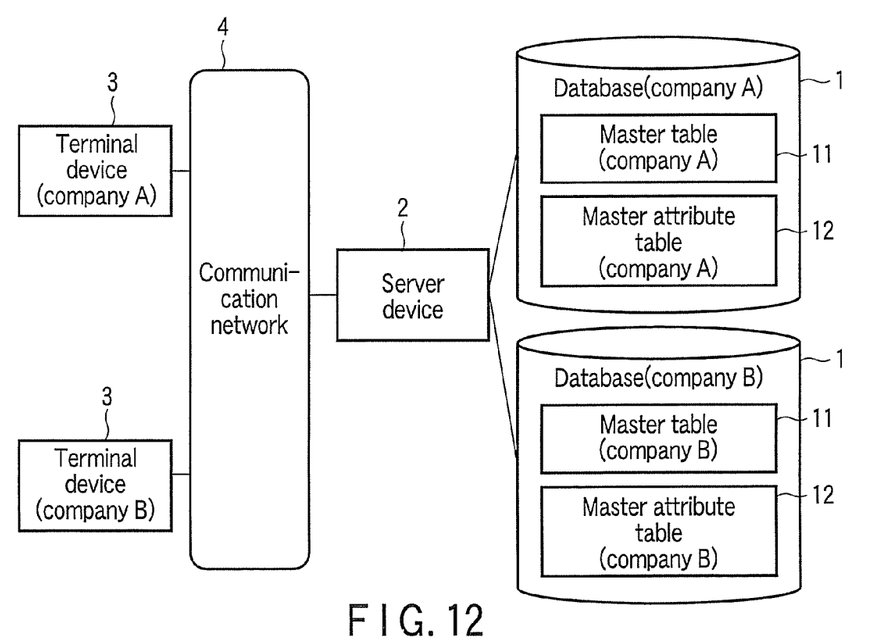
FIG. 12 is a block diagram showing a database system according to a second modification.

FIG. 12 is a block diagram showing a second form of the database system that is modified as described above.

The database system shown in FIG. 12 includes the database 1 and the terminal device 3 for company A, the database 1 and the terminal device 3 for company B, and the server device 2 shared by company A and company B. The server device 2 reads out the master table 11 and the master attribute table 12 for company A from the database 1 for company A in response to a request from the terminal device 3 for company A, and transmits the read-out tables to the terminal device 3 for company A. The server device 2 also reads out the master table 11 and the master attribute table 12 for company B from the database 1 for company B in response to a request from the terminal device 3 for company B, and transmits the read-out tables to the terminal device 3 for company B.

Figure 13:
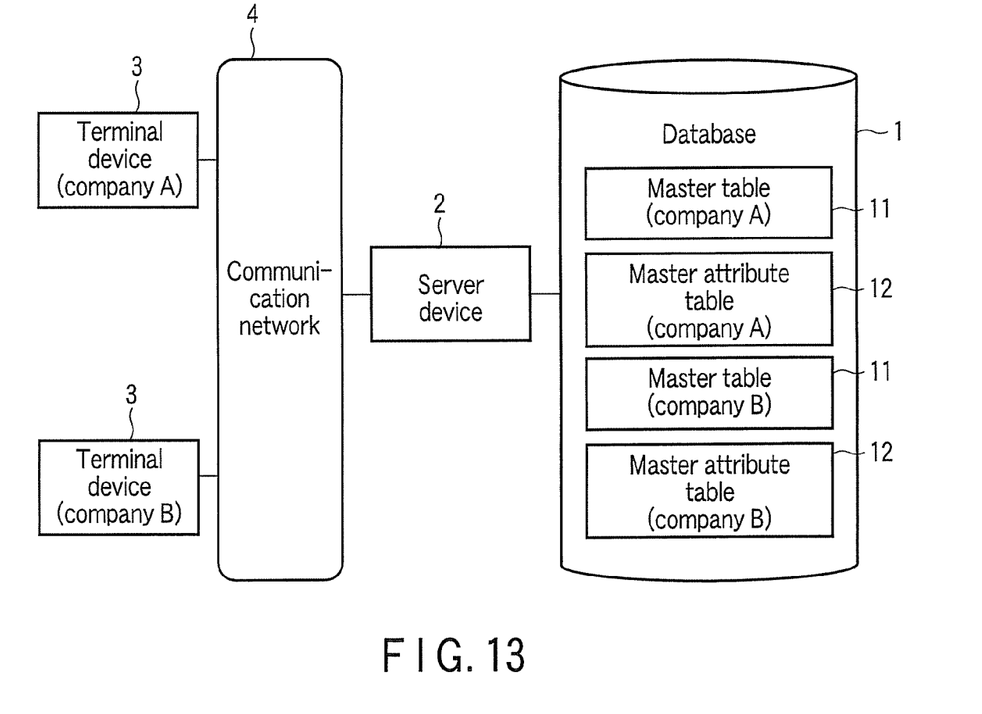
FIG. 13 is a block diagram showing a database system according to a third modification.

FIG. 13 is a block diagram showing a third form of the database system that is modified as described above.

The database system shown in FIG. 13 includes the terminal device 3 for company A, the terminal device 3 for company B, and the database 1 and the server device 2 that are shared by company A and company B. However, in the database 1, the master table 11 and the master attribute table 12 for company A and the master table 11 and the master attribute table 12 for company B are stored. The server device 2 reads out the master table 11 and the master attribute table 12 for company A from the database 1 in response to a request from the terminal device 3 for company A, and transmits the read-out tables to the terminal device 3 for company A. The server device 2 also reads out the master table 11 and the master attribute table 12 for company B from the database 1 in response to a request from the terminal device 3 for company B, and transmits the read-out tables to the terminal device 3 for company B.

The configurations shown in FIG. 11 to FIG. 13 can be similarly applied to a case where three or more companies are users of the database system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A database system comprising:
a first storage unit which stores a master table describing plural first data records, each of the first data records including information about plural information fields including an information field for an identification code;
a second storage unit which stores a master attribute table describing plural second data records, each of the second data records including information fields for plural pieces of attribute information, display application information and the identification code, wherein each of the plural pieces of attribute information represents a display form of the information included in the first data record, and wherein the display application information indicates whether the second data record is effective information to define the display form or not;
a server device capable of accessing the first and second storage units;
a terminal device capable of communicating with the server device;
a first communication unit in the server device;
a second communication unit in the terminal device, wherein the first and second communication units are configured to communicate with each other;
an input unit in the terminal device, configured to input the identification code;
a first transmission unit in the terminal device, configured to transmit request information via the second communication unit, wherein the request information includes the identification code input by the input unit;
a first reception unit in the server device, configured to receive the request information via the first communication unit;
a first creation unit in the server device, configured to select data records from the first data records in the first storage unit to create an extract master table as an aggregate of the selected data records, wherein the selected data records from the first data records include information in the information field for the identification code that matches with the identification code in the request information received by the first reception unit;
a second creation unit in the server device, configured to select data records from the second data records in the second storage unit to create an extract attribute table as an aggregate of the selected data records, wherein the selected data records from the second data records include information in the information field for the identification code that matches with the identification code in the request information received by the first reception unit or that matches with a common code;
a second transmission unit in the server device, configured to transmit a response information via the first communication unit to the terminal device which originated the a request information, wherein the response information includes the extract master table and the extract attribute table;

a second reception unit in the terminal device, configured to receive the response information via the second communication unit; and
a generating unit in the terminal device, configured to generate a display image for displaying the information included in the extract master table in the response information received by the second reception unit, in the display form represented by the attribute information in the extract attribute table in the response information, which attribute information is in the second data record in the extract attribute table that includes the display application information indicating that the second data record is the effective information.

2. A server device, together with a terminal device, constituting the database system of claim 1, the server device comprising:
the first communication unit, the first reception unit, the first creation unit, the second creation unit, and the second transmission unit of claim 1.

3. A terminal device constituting the database system of claim 1, together with a server device capable of accessing each of the first and second storage units of claim 1, the terminal device comprising:
the second communication unit, the input unit, the first transmission unit, the second reception unit, and the generating unit of claim 1.

4. The database system of claim 1, further comprising:
an authentication unit in the server database, wherein
the input unit is configured to input a password together with the identification code,
the first transmission unit is configured to include the password in the request information,
the authentication unit is configured to check whether the password in the request information received by the first reception unit has been set for the identification code in the request information or not to authenticate an accessing entity, and
the second transmission unit is configured to transmit the response information only if authentication by the identification unit has been made.

5. The database system of claim 1, wherein
the plural pieces of attribute information includes an attribute information representing a display name of the information included in the first data record, and
the generating unit is configured to generate the display image such that the display name represented by the attribute information is displayed in association with the information included in the extract master table.

6. The database system of claim 1, wherein the master attribute table allows the plural second data records, which have different information in the information fields for the identification code, to include the attribute information representing different display forms for the same information included in the first data records.

7. A data presentation method implemented by a first storage unit, a second storage unit, a server device capable of accessing the first storage unit and the second storage unit, and a terminal device, wherein
the first storage unit stores a master table describing plural first data records, each of the first data records including information about plural information fields including an information field for an identification code,
the second storage unit stores a master attribute table describing plural second data records, each of the second data records including information fields for plural pieces of attribute information, display application information and the identification code, wherein each of the plural pieces of attribute information represents a display form of the information included in the first data record, information indicates whether the second data record is effective information to define the display form or not, and information included in the first data records is presented by the terminal device, the method comprising:

inputting, in the terminal device, the identification code;

transmitting, from the terminal device, request information to the server device, wherein the request information includes the input identification code;

receiving, by the server device, the request information;

selecting, by the server device, data records from the first data records in the first storage unit to create an extract master table as an aggregate of the selected data records, wherein the selected data records from the first data records include information in the information field for the identification code that matches with the identification code in the received request information;

selecting, by the server device, data records from the second data records in the second storage unit to create an extract attribute table as an aggregate of the selected data records, wherein the selected data records from the second data records include information in the information field for the identification code that matches with the identification code in the received request information or that matches with a common code;

transmitting, by the server device, response information to the terminal device which originated the request information, wherein the response information includes the extract master table and the extract attribute table;

receiving, by the terminal device, the response information; and generating, by the terminal device, a display image for displaying the information included in the extract master table in the received response information, in the display form represented by the attribute information in the extract attribute table in the response information, which attribute information is in the second data record in the extract attribute table that includes the display application information indicating that the second data record is the effective information.

* * * * *